United States Patent [19]

Lyu

[11] Patent Number: 6,149,513

[45] Date of Patent: Nov. 21, 2000

[54] CEILING GRILLE FOR AIR CONDITIONER OF RECREATIONAL VEHICLE

[75] Inventor: Jeong-Un Lyu, Kwangju, Rep. of Korea

[73] Assignee: Carrier Corporation, Syracuse, N.Y.

[21] Appl. No.: 09/351,447

[22] Filed: Jul. 12, 1999

[51] Int. Cl.[7] .................................................... B60H 1/34
[52] U.S. Cl. ..................... 454/152; 454/108; 454/300; 454/311; 454/323
[58] Field of Search .................................... 454/136, 137, 454/138, 152, 108, 300, 311, 323

[56] References Cited

U.S. PATENT DOCUMENTS

| | | | |
|---|---|---|---|
| 3,401,620 | 9/1968 | Armstrong et al. | 454/152 |
| 5,162,018 | 11/1992 | Horton | 454/76 |
| 6,074,295 | 6/2000 | Volkj | 454/152 |

*Primary Examiner*—Harold Joyce
*Assistant Examiner*—Derek S. Boles

[57] ABSTRACT

Disclosed is a ceiling grille for an air conditioner of a recreational vehicle. A center grille part is disposed on a lower surface of the ceiling grille for discharging cooled air in a vertical downward direction. The center grille part has a first center opening. A closure member is arranged above the center grille part for opening and closing the center grille part while being moved up and down. The closure member has a second center opening aligned with the first center opening and a cam part placed around the second center opening. A guide section guides upward and downward movements of the closure member. A spring is intervened between the center grille part and the closure member for biasing upward the closure member. A knob is rotatably fitted into the first and second center openings. A cap member is coupled to the knob to be integrally rotated therewith. The cap member has a plurality of projections which slide on an upper end surface of the cam part to cause the closure member to be moved up and down.

3 Claims, 3 Drawing Sheets

CEILING GRILLE FOR AIR CONDITIONER OF RECREATIONAL VEHICLE

BACKGROUND OF THE INVENTION

1. Field of the Invention

The present invention relates to a ceiling grille for an air conditioner mounted to a roof panel of a vehicle for air-conditioning a passenger compartment to thereby afford comfortable on-board environment. More particularly, the present invention relates to a ceiling grille for an air conditioner of a recreational vehicle, which can discharge a cooled air in a vertical downward direction into a passenger compartment by a simple manipulation of a knob.

2. Description of the Prior Art

Generally, an air conditioner mounted to a roof panel of a vehicle, is of benefit to ease an air flow for passing through an evaporator and to uniformly deliver cooled air to front and rear portions of a passenger compartment.

An air conditioner for a recreational vehicle performs its air-conditioning function by intaking warm air from a passenger compartment through a pair of filters 10F disposed at both sides of a ceiling grille 10, respectively, as shown in FIG. 1, passing the warm air through an evaporator (not shown), conveying cooled air to a center portion of the ceiling grille 10 via a blower, and discharging the cooled air forward and rearward to cool the passenger compartment.

However, the ceiling grille of the prior art, constructed as mentioned above, suffers from defects in that since the cooled air is not discharged in a vertical downward direction, a passenger cannot soon enjoy the cooled air in a severely hot weather.

In view of the above statement, demand is increasing for an air conditioner which can directly deliver cooled air to a passenger as occasion arises.

SUMMARY OF THE INVENTION

Accordingly, the present invention has been made in an effort to solve the problems occurring in the prior art, and an object of the present invention is to provide a ceiling grille for an air conditioner of a recreational vehicle, by which cooled air can be discharged from the air conditioner in various directions as occasion demands to satisfy diverse desires of a passenger.

In order to achieve the above object, according to the present invention, there is provided a ceiling grille for an air conditioner of a recreational vehicle, comprising: a center grille part disposed on a lower surface of the ceiling grille for discharging cooled air in a vertical downward direction, the center grille part having a first center opening; a closure member arranged above the center grille part for opening and closing the center grille part while being moved up and down, the closure member having a second center opening aligned with the first center opening and a cam part placed around the second center opening; a guide section for guiding upward and downward movements of the closure member; a spring intervened between the center grille part and the closure member for biasing upward the closure member; a knob rotatable fitted into the first and second center openings; and a cap member coupled to the knob to be integrally rotated therewith and having a plurality of projections which slide on an upper end surface of the cam part to cause the closure member to be moved up and down.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
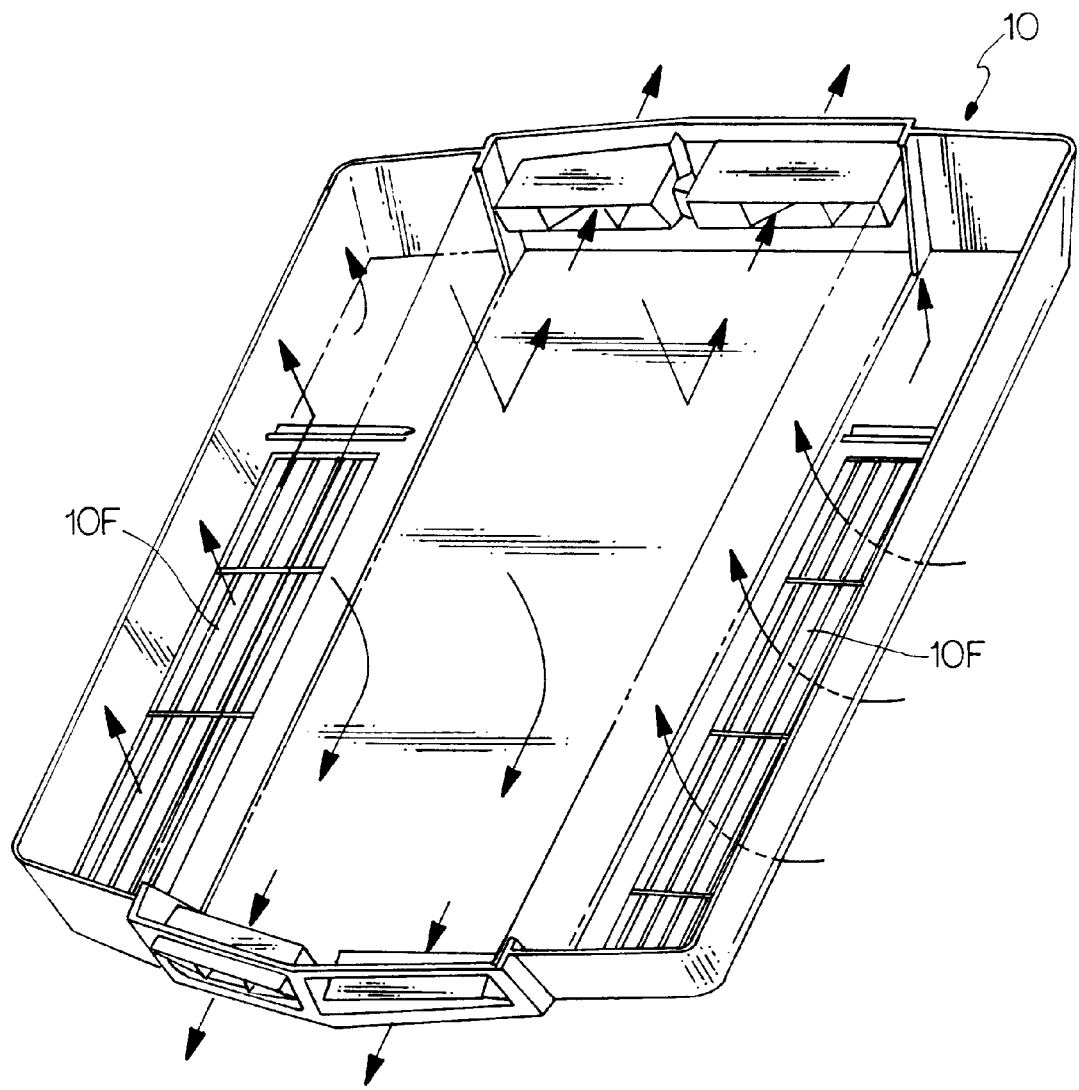
FIG. 1 is a perspective view of a ceiling grille for an air conditioner, of the prior art.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
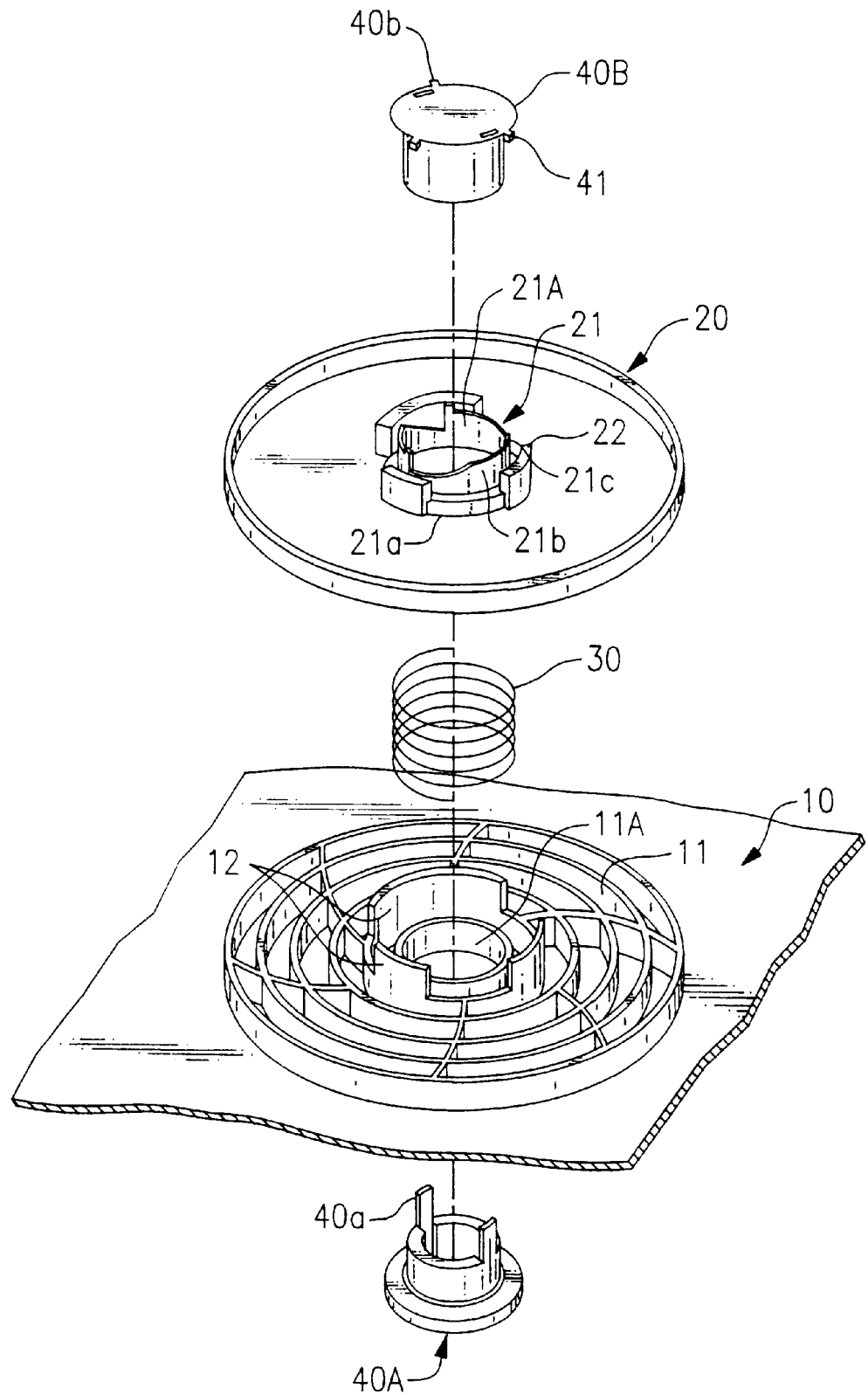
FIG. 2 is an exploded perspective view of a ceiling grille for an air conditioner of a recreational vehicle, in accordance with an embodiment of the present invention.

Referring to FIG. 2, a ceiling grille 10 for an air conditioner of a recreational vehicle, in accordance with an embodiment of the present invention, includes a center grille part 11 disposed on a lower surface of the ceiling grille 10 for discharging cooled air in a vertical downward direction, the center grille part 11 having a first center opening 11A; a closure member 20 arranged above the center grille part 11 for opening and closing the center grille part 11 while being moved up and down, the closure member 20 having a second center opening 21A aligned with the first center opening 11A and a cam part 21 placed around the second center opening 21A; guide means 12 and 22 for guiding upward and downward movements of the closure member 20; a spring 30 intervened between the center grille part 11 and the closure member 20 for biasing upward the closure member 20; a knob 40A rotatably fitted into the first and second center openings 11A and 21A; and a cap member 40B coupled to the knob 40A to be integrally rotated therewith and having a plurality of projections 41 which slide on an upper end surface of the cam part 21 to cause the closure member 20 to be moved up and down.

On the other hand, the guide means consists of a vertical wall 12 formed around the first center opening 11A of the center grille part 11, and a housing part 22 formed around the second center opening 21A of the closure member 20 such that it is opposed to the vertical wall 12. The housing part 22 has a circumferential groove into which the vertical wall 12 is fitted.

The cam part 21 of the closure member 20 has a cylindrical wall-shaped configuration, and the upper end surface of the cam part 21 has a plurality of inclined portions 21a, horizontal portions 21b and stepped portions 21c which are alternately formed. In a preferred embodiment of the present invention, three pairs of inclined portions 21a, horizontal portions 21b and stepped portions 21c, are alternately formed. In another preferred embodiment of the present invention, the cam part 21 has two pairs of inclined portions 21a, horizontal portions 21b and stepped portions 21c.

The drawing reference numeral 40a represents a pair of elastic hooks formed at an upper end of the knob 40A such that they project upward while being opposite to each other. Also, the drawing reference numeral 40b represents a pair of locking holes defined in an upper wall which closes an upper end of the cylindrical cap member 40B. The knob 40A and the cap member 40B are securely fixed to each other by the fact that the pair of elastic nooks 40a are locked into the pair of locking holes 40b, respectively.

Hereinafter, operations of the ceiling grille according to the present invention, constructed as mentioned above, will be described in detail.

By a simple manipulation of the knob 40A which protrudes from the lower surface of the ceiling grille 10, a passenger can enjoy the cooled air discharged into a center portion of a passenger compartment in the vertical downward direction.

Figure 3A:
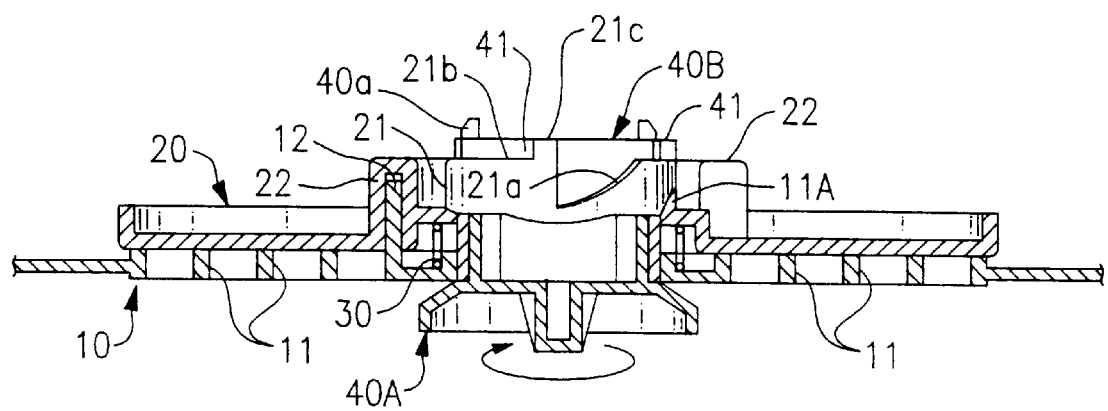
FIG. 3a is a cross-sectional view illustrating the ceiling grille of FIG. 2, which is in a closed position.

Referring to FIG. 3a, there is shown a cross-sectional view illustrating the ceiling grille of FIG. 2, which is in a closed position. When the ceiling grille 10 is in the closed position as shown in FIG. 3a, the cooled air can be discharged only toward the front and rear portions of the passenger compartment.

In other words, when the ceiling grille 10 is in the closed position, the vertical wall 12 of the center grille part 11 is fully inserted into the circumferential groove formed in the housing part 22, and the closure member 20 compresses the spring 30 against the center grille part 11. The plurality of projections 41 of the cap member 40B are located on the plurality of horizontal portions 21b, respectively, of the cam part 21 of the closure member 20, to cause the closure member 20 to close the center grille part 11.

Figure 3B:
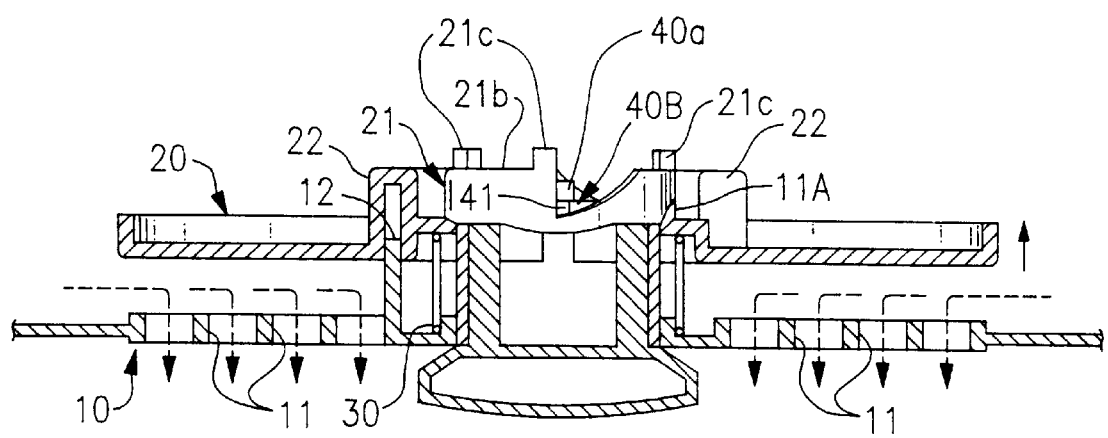
FIG. 3b is a cross-sectional view illustrating the ceiling grille of FIG. 2, which is in an opened position.

When the passenger desires to enjoy the cooled air delivered vertically and downward, by rotating the knob 40A in a counterclockwise direction, the plurality of projections 41 of the cap member 40B securely fixed to the knob 40A, slide on the plurality of horizontal portions 21b of the cam part 21. Thereafter, the plurality of projections 41 are pivoted on the plurality of inclined portions 21a, respectively, of the cam part 21 by a biasing force of the spring 30, by which the closure member 20 is raised to open the center grille part 11. Referring to FIG. 3b, there is shown a cross-sectional view illustrating the ceiling grille of FIG. 2, which is in an opened position. Accordingly, the cooled air can be discharged through the center grille part 11 in the vertical downward direction.

At this time, the vertical wall 12 and the housing part 22 serve to guide the upward and downward movements of the closure member 20, and the plurality of stepped portions 21c of the cam part 21 serve to prevent further movements of the plurality of projections 41.

As a result, according to the present invention, advantages are provided in that a system for discharging cooled air in a vertical downward direction into a passenger compartment by a simple manipulation of a knob, is mounted to a lower surface of a ceiling grille, to cause the cooled air to be directly delivered to a passenger in a hot weather, whereby the passenger can enjoy the cooled air in diverse weather conditions as occasion demands.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A ceiling grille for an air conditioner of a recreational vehicle, comprising:

a center grille part disposed on a lower surface of the ceiling grille for discharging cooled air in a vertical downward direction, the center grille part having a first center opening;

a closure member arranged above the center grille part for opening and closing the center grille part while being moved up and down, the closure member having a second center opening aligned with the first center opening and a cam part placed around the second center opening;

guide means for guiding upward and downward movements of the closure member;

a spring intervened between the center grille part and the closure member for biasing upward the closure member;

a knob rotatably fitted into the first and second center openings; and a cap member coupled to the knob to be integrally rotated therewith and having a plurality of projections which slide on an upper end surface of the cam part to cause the closure member to be moved up and down.

2. The ceiling grille as claimed in claim 1, wherein the guide means comprises:

a vertical wall formed around the first center opening of the center grille part; and a housing part formed around the second center opening of the closure member such that it is opposed to the vertical wall, the housing part having a circumferential groove into which the vertical wall is fitted.

3. The ceiling grille as claimed in claim 1, wherein the cam part of the closure member has a cylindrical wall-shaped configuration, and the upper end surface of the cam part has a plurality of inclined portions, horizontal portions and stepped portions which are alternately formed.

* * * * *